US012695593B1

(12) United States Patent
Girard et al.

(10) Patent No.: US 12,695,593 B1
(45) Date of Patent: Jul. 28, 2026

(54) HOMOMORPHIC ENCRYPTION-ENABLED PARALLEL FILE SYSTEM

(71) Applicant: VDURA, Inc., San Jose, CA (US)

(72) Inventors: Christopher Girard, Sanford, FL (US); Ian Davies, Longmont, CO (US)

(73) Assignee: VDURA, Inc., San Jose, CA (US)

( * ) Notice: Subject to any disclaimer, the term of this patent is extended or adjusted under 35 U.S.C. 154(b) by 0 days.

(21) Appl. No.: 19/305,209

(22) Filed: Aug. 20, 2025

(51) Int. Cl.
    *H04L 9/00*     (2022.01)
    *G06F 16/18*     (2019.01)

(52) U.S. Cl.
    CPC .......... *H04L 9/008* (2013.01); *G06F 16/1858* (2019.01)

(58) Field of Classification Search
    CPC ............................. H04L 9/008; G06F 16/1858
    See application file for complete search history.

(56) References Cited

U.S. PATENT DOCUMENTS

| | | | | | |
|---|---|---|---|---|---|
| 5,960,446 | A * | 9/1999 | Schmuck | ............ | G06F 16/1858 |
| | | | | | 707/823 |
| 8,543,596 | B1 * | 9/2013 | Kostamaa | ............. | G06F 16/182 |
| | | | | | 711/202 |
| 8,589,550 | B1 * | 11/2013 | Faibish | ................ | G06F 3/0662 |
| | | | | | 709/225 |
| 9,158,540 | B1 * | 10/2015 | Tzelnic | ................ | G06F 11/108 |
| 9,298,733 | B1 * | 3/2016 | Faibish | .............. | G06F 16/1827 |
| 9,317,521 | B1 * | 4/2016 | Bent | .................. | G06F 16/1815 |

| | | | | | |
|---|---|---|---|---|---|
| 9,436,722 | B1 * | 9/2016 | Bent | ................... | G06F 16/2365 |
| 9,501,488 | B1 * | 11/2016 | Bent | ...................... | G06F 16/182 |
| 9,513,836 | B1 * | 12/2016 | Hasegawa | ............ | G06F 3/0647 |
| 9,747,128 | B1 * | 8/2017 | Vijendra | ................. | G06F 9/466 |
| 9,747,219 | B1 * | 8/2017 | Bashari | .............. | G06F 13/4068 |
| 9,767,107 | B1 * | 9/2017 | Bent | ................. | G06F 16/1858 |
| 9,811,530 | B1 * | 11/2017 | Bent | ..................... | G06F 16/182 |
| 10,075,385 | B1 * | 9/2018 | Thompson | .......... | G06F 9/45504 |
| 10,157,003 | B1 * | 12/2018 | Faibish | .............. | G06F 11/2058 |
| 10,162,836 | B1 * | 12/2018 | Bent | .................. | G06F 16/1858 |
| 10,409,682 | B1 * | 9/2019 | Davies | ................ | G06F 11/1092 |
| 10,545,682 | B1 * | 1/2020 | Dalal | ................... | G06F 3/0644 |
| 10,599,624 | B1 * | 3/2020 | Faibish | .............. | G06F 16/1858 |
| 10,706,014 | B1 * | 7/2020 | Gupta | ................... | G06F 3/0604 |
| 10,740,005 | B1 * | 8/2020 | Ives | ........................ | G06F 3/067 |
| 10,901,943 | B1 * | 1/2021 | Bent | .................... | G06F 3/0685 |
| 11,086,732 | B2 * | 8/2021 | Srinivasan | .......... | G06F 11/1469 |
| 11,138,232 | B1 * | 10/2021 | Paraschiv | ............. | G06F 16/182 |

(Continued)

*Primary Examiner* — Aravind K Moorthy
(74) *Attorney, Agent, or Firm* — Fenwick & West LLP

(57) ABSTRACT

A storage system, for example, a parallel file system stores and processes encrypted data. The parallel file system receives a write request from a client device, to store data. The parallel file system determines a distribution map for storing the data and sends to the client device. A plurality of chunks of encrypted data encrypted using homomorphic encryption are received. The parallel file system stores each of the plurality of chunks in a storage node according to the distribution map. The parallel file system receives a request to perform a computation, for example, compression, deduplication, data mining, or collaborative processing of shared data. The parallel file system performs the computation in parallel on the plurality of storage nodes. The computation is performed on the encrypted data without decrypting the encrypted data. The parallel file system sends the result of computation to a client device.

20 Claims, 8 Drawing Sheets

(56) References Cited

U.S. PATENT DOCUMENTS

| | | | | |
|---|---|---|---|---|
| 11,276,088 | B1* | 3/2022 | Saifee | G06Q 30/0275 |
| 11,385,806 | B1* | 7/2022 | Banerjee | G06F 3/0689 |
| 12,367,101 | B1* | 7/2025 | Sinnamohideen | G06F 11/1076 |
| 12,566,700 | B2* | 3/2026 | Stabrawa | G06F 12/0646 |
| 2006/0031230 | A1* | 2/2006 | Kumar | G06F 16/182 |
| 2007/0208839 | A1* | 9/2007 | Voigt | G06F 12/0253 |
| | | | | 709/223 |
| 2008/0052455 | A1* | 2/2008 | Ahmadian | G06F 3/0605 |
| | | | | 711/147 |
| 2008/0120435 | A1* | 5/2008 | Moreira | G06F 16/1774 |
| | | | | 710/1 |
| 2009/0276448 | A1* | 11/2009 | Coleman | G06F 16/116 |
| 2010/0014442 | A1* | 1/2010 | Ashwood-Smith | H04L 45/00 |
| | | | | 370/255 |
| 2011/0010690 | A1* | 1/2011 | Howard | G06F 8/456 |
| | | | | 717/128 |
| 2012/0026908 | A1* | 2/2012 | Tzannes | H04L 41/12 |
| | | | | 370/252 |
| 2012/0158882 | A1* | 6/2012 | Oehme | G16H 30/20 |
| | | | | 709/213 |
| 2013/0067138 | A1* | 3/2013 | Schuette | G06F 3/0629 |
| | | | | 711/E12.008 |
| 2014/0136890 | A1* | 5/2014 | Aho | G06F 11/0709 |
| | | | | 714/15 |
| 2014/0324928 | A1* | 10/2014 | Tinker | G06F 16/183 |
| | | | | 707/827 |
| 2014/0379767 | A1* | 12/2014 | Halevy | H04L 67/1097 |
| | | | | 707/827 |
| 2015/0095384 | A1* | 4/2015 | Antony | H04L 69/14 |
| | | | | 707/827 |
| 2015/0120793 | A1* | 4/2015 | Hong | H04L 67/1097 |
| | | | | 707/827 |
| 2015/0149742 | A1* | 5/2015 | Richter | G06F 12/08 |
| | | | | 711/206 |
| 2015/0163287 | A1* | 6/2015 | Gooding | G06F 9/52 |
| | | | | 709/201 |
| 2015/0227930 | A1* | 8/2015 | Quigley | H04L 9/3013 |
| | | | | 705/72 |
| 2015/0248402 | A1* | 9/2015 | Patterson, III | G06F 9/50 |
| | | | | 707/693 |
| 2016/0004720 | A1* | 1/2016 | Tabaaloute | G06F 16/289 |
| | | | | 707/639 |
| 2016/0034481 | A1* | 2/2016 | Kumarasamy | G06F 16/128 |
| | | | | 707/639 |
| 2016/0041970 | A1* | 2/2016 | Tripathy | G06F 40/205 |
| | | | | 707/755 |
| 2016/0063007 | A1* | 3/2016 | Iwasaki | G06F 16/2228 |
| | | | | 707/645 |
| 2016/0078656 | A1* | 3/2016 | Borson | G06F 16/51 |
| | | | | 345/472 |
| 2016/0342521 | A1* | 11/2016 | Richmond | G06F 12/0884 |
| 2016/0378752 | A1* | 12/2016 | Anderson | G06F 16/2255 |
| | | | | 707/747 |
| 2017/0031603 | A1* | 2/2017 | Hasegawa | G06F 3/0686 |
| 2017/0031937 | A1* | 2/2017 | Bowman | G06F 9/5072 |
| 2017/0090765 | A1* | 3/2017 | Balinski | G06F 3/0643 |
| 2017/0154039 | A1* | 6/2017 | Crawford | G06F 16/11 |
| 2017/0371896 | A1* | 12/2017 | Pachunoori | G06F 16/1865 |
| 2018/0081540 | A1* | 3/2018 | Aho | G06F 16/86 |
| 2018/0095786 | A1* | 4/2018 | Misra | G06F 9/5077 |
| 2018/0288154 | A1* | 10/2018 | Ghazaleh | G06F 3/0659 |
| 2019/0332318 | A1* | 10/2019 | Gooding | G06F 3/0656 |
| 2019/0391743 | A1* | 12/2019 | Matsui | G06F 3/0649 |
| 2020/0004852 | A1* | 1/2020 | Qiu | G06F 16/134 |
| 2020/0125450 | A1* | 4/2020 | Aron | G06F 16/2246 |
| 2020/0134204 | A1* | 4/2020 | Furukawa | G06F 21/64 |
| 2020/0210834 | A1* | 7/2020 | D'Ercoli | G06V 10/82 |
| 2020/0259651 | A1* | 8/2020 | Mohassel | H04L 9/3218 |
| 2020/0341906 | A1* | 10/2020 | Steinke | G06F 3/061 |
| 2021/0064589 | A1* | 3/2021 | Wang | G06F 16/137 |
| 2021/0336771 | A1* | 10/2021 | Mukherjee | H04L 9/0869 |
| 2023/0008874 | A1* | 1/2023 | Stabrawa | G06F 9/45558 |
| 2023/0269067 | A1* | 8/2023 | Son | G06F 7/722 |
| | | | | 380/28 |
| 2023/0344792 | A1* | 10/2023 | Friedman | G06F 21/6254 |
| 2023/0350728 | A1* | 11/2023 | Briliauskas | G06F 21/562 |
| 2023/0362231 | A1* | 11/2023 | Kumar | H04L 67/52 |
| 2024/0020154 | A1* | 1/2024 | Hayano | G06F 7/57 |
| 2024/0231688 | A1* | 7/2024 | Moore | G06F 3/0659 |
| 2025/0005193 | A1* | 1/2025 | Zhu | G06F 21/6245 |
| 2025/0021620 | A1* | 1/2025 | Zhu | G06F 17/16 |
| 2025/0165407 | A1* | 5/2025 | Huang | G06F 12/1408 |
| 2025/0274263 | A1* | 8/2025 | Drucker | H04L 9/06 |

* cited by examiner

710
Receive request to perform computation from a client device

For each storage node storing the encrypted data

720
Perform computation in parallel on encrypted data to determine partial result 730
Send partial result to director node 740
Combine partial results in director node to determine final result 750
Send final result to client device

HOMOMORPHIC ENCRYPTION-ENABLED PARALLEL FILE SYSTEM

BACKGROUND

1. Field of the Disclosure

The present disclosure relates to data encryption in storage systems in general and more specifically to using homomorphic encryption for secure computation in parallel or distributed file systems.

2. Description of the Related Art

High performance computations such as scientific computations or neural network computations for artificial intelligence are complex and require large parallel or distributed systems. Such distributed computing environments often use parallel file systems to store and access large-scale datasets across multiple storage nodes. Several of these applications store and process sensitive data. Storage systems often face significant challenges in storing and processing sensitive data. Existing approaches to secure computations in parallel and distributed filesystems lack scalability or incur significant performance overhead. Conventional techniques for secure computation require decryption of data for processing, which makes the data potentially accessible to malicious actors, thereby increasing vulnerability to data breaches and unauthorized access.

SUMMARY

Embodiments concern storage and processing of encrypted data in a parallel file system. The parallel file system receives a write request from a client device to store data in the parallel file system. In response to receiving the write request, the parallel file system determines a distribution map for storing the data. The distribution map identifies a plurality of storage nodes and includes a mapping from portions of data to storage nodes. The distribution map may be determined by a director node of the parallel file system. The distribution map is sent to the client device. A plurality of chunks of data encrypted using homomorphic encryption are received. The parallel file system stores each of the plurality of chunks of encrypted data in a storage node as distributed according to the distribution map. The parallel file system further receives a request to perform a computation on the encrypted data. Examples of computation include compression, deduplication, data mining, or collaborative processing of shared data. The parallel file system performs the computation in parallel on the plurality of storage nodes without decrypting the encrypted data. The parallel file system sends the result of computation to the client device.

According to an embodiment, the steps described herein are executed as a process. According to an embodiment, a non-transitory computer readable storage medium comprising stored program code including instructions that when executed by one or more computer processors, cause the one or more computer processors to perform the steps of the methods described herein. Other embodiments include computer systems that include one or more processors and a non-transitory computer readable storage medium comprising stored program code including instructions that when executed by the one or more computer processors, cause the one or more computer processors to perform the steps of the methods described herein.

BRIEF DESCRIPTION OF THE DRAWINGS

The teachings of the embodiments can be readily understood by considering the following detailed description in conjunction with the accompanying drawings.

Figure 1:
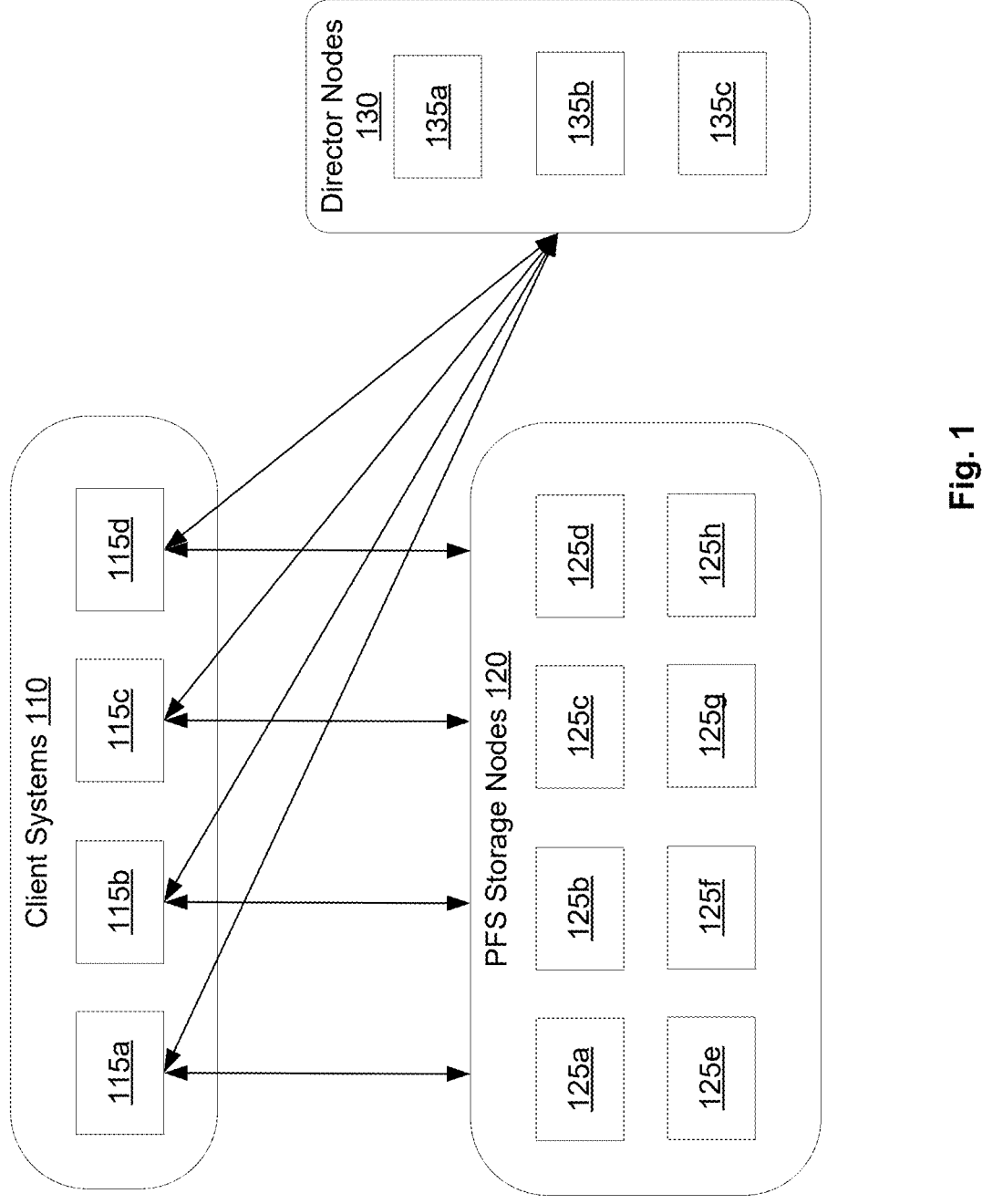
FIG. 1 illustrates the various components in the system environment of a parallel file system, according to an embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

A storage system uses homomorphic encryption to perform secure computation on encrypted data. The storage system uses homomorphic encryption to perform secure computation on encrypted data without decrypting the data. The storage system performs processing of encrypted data including compression of encrypted data, deduplication using encrypted data, data mining of encrypted data, and collaborative processing of shared encrypted data without decrypting the data. The storage system performs computations directly on encrypted data without sacrificing security or efficiency. Accordingly, the storage system according to various embodiments overcomes shortcomings of existing approaches to secure computation in distributed filesystems that lack scalability or incur significant performance overhead. The storage system provides technical improvements over existing systems since the storage system provides improvements to the security of data as the data can be processed without being decrypted. As a result, even if a malicious actor is able to gain access to the storage system, the malicious actor does not get access to decrypted data. In contrast, conventional systems that require the data to be decrypted for processing are less secure since a malicious actor that gains access to the system is able to access the data. Accordingly, the techniques disclosed improve the security of storage systems such as parallel file systems.

According to an embodiment, the system implements a parallel file system that uses multiple storage nodes and performs parallel and redundant access to data storage nodes to deliver high performance data access with scalability and reliability. The PFS uses a storage system that includes multiple storage nodes (also referred to as servers) and storage devices. Examples of storage devices include HDD (hard disk drive) and SSD (solid state drive.) The storage system is built as a resilient platform, such that when components fail, the system repairs itself to maintain availability and durability of the data. The components of the storage system that are most likely to fail are the storage devices (e.g., HDDs) on which most of the data is stored upon. Other components may also fail depending on their MTBF (mean time between failure)/AFR (annualized failure rate).

FIG. 1 illustrates the various components in the system environment of a PFS, according to an embodiment. The system environment of the PFS includes a set 110 of client systems 115a, 115b, 115c, 115d, a set 120 or storage nodes 125a, 125b, 125c, 125d, 125e, 125f, 125g, 125h and a set 130 of director nodes 135a, 135b, 135c. The director nodes 135 and storage nodes 125 are computer systems that run the parallel file system. A client system 115 includes a client driver that is a loadable software module that interacts with the director nodes and storage nodes to read and write the files stored by the parallel file system. Any required administration is performed via a graphical user interface (GUI) or call level interface (CLI) running on a director node 135. All the director nodes and storage nodes work together to provide a single file system namespace referred to as a realm.

According to an embodiment, the PFS separates the control plane from the data plane. The director nodes 135 in the PFS form the control plane. The director nodes 135 perform various tasks including caching and modifying file system metadata (e.g., directories, file attributes, access permissions, etc.), coordinating the actions of the storage nodes 125 and the client drivers for file accesses, managing membership status of director and storage nodes within the PFS storage cluster, and controlling all failure recovery and data reliability operations. According to an embodiment, director nodes 135 are commodity compute servers with a high-speed networking connection, significant DRAM capacity, and a persistent store for transaction logs.

Storage nodes in the PFS form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the PFS is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The PFS scales out both director nodes 135 and storage nodes 125. For any given configuration of the system, additional director nodes can be added for more metadata processing performance. Similarly additional storage nodes can be added for more capacity or more storage performance.

Figure 2:
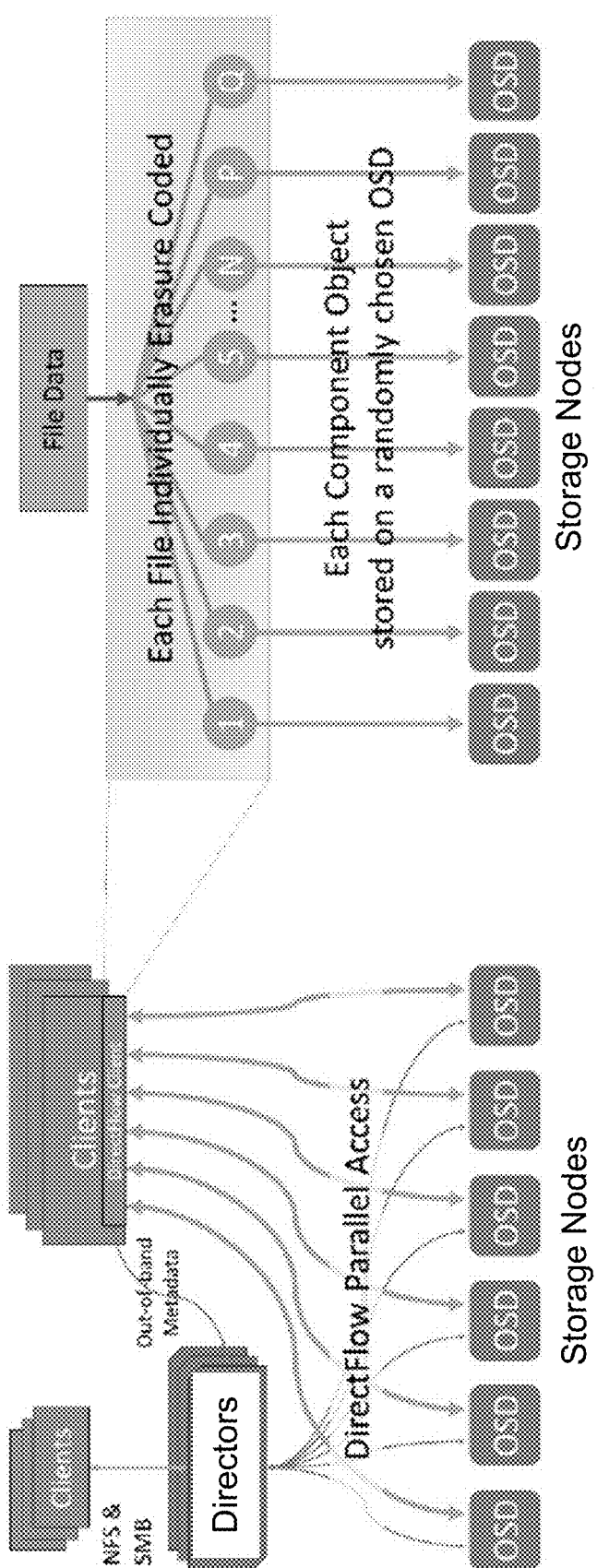
FIG. 2 illustrates how data is stored in a file in the parallel file system, according to an embodiment.

FIG. 2 illustrates how data is stored in a file in the parallel file system, according to an embodiment. The PFS uses multiple storage nodes by assigning a map to each file. The map for a file shows where all the striped component parts of that file are located, and which storage node holds each part. The client driver uses the map to determine which storage nodes to access, directly or in parallel. PFS uses network erasure coding as part of that striping to ensure data integrity and reliability.

The client driver provides the semantics of a locally-mounted, POSIX-compliant file system. The PFS ensures that if a process P2 (possibly on another compute server) is writing to a file at the same time the process P1 is reading from the file, this process P1 will not read stale data. Accordingly, PFS provides cache coherency across all the nodes running the client driver.

PFS performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the PFS provides a consistent system performance.

According to an embodiment, the PFS performs active capacity balancing to maintain consistent system performance. If the system load balance is off by more than a threshold, for example, if many files are deleted at once and a storage node is significantly less utilized compared to others, the director nodes examine utilization of all the storage nodes and transparently move component objects from over-loaded storage nodes to underutilized storage nodes.

Figure 3:
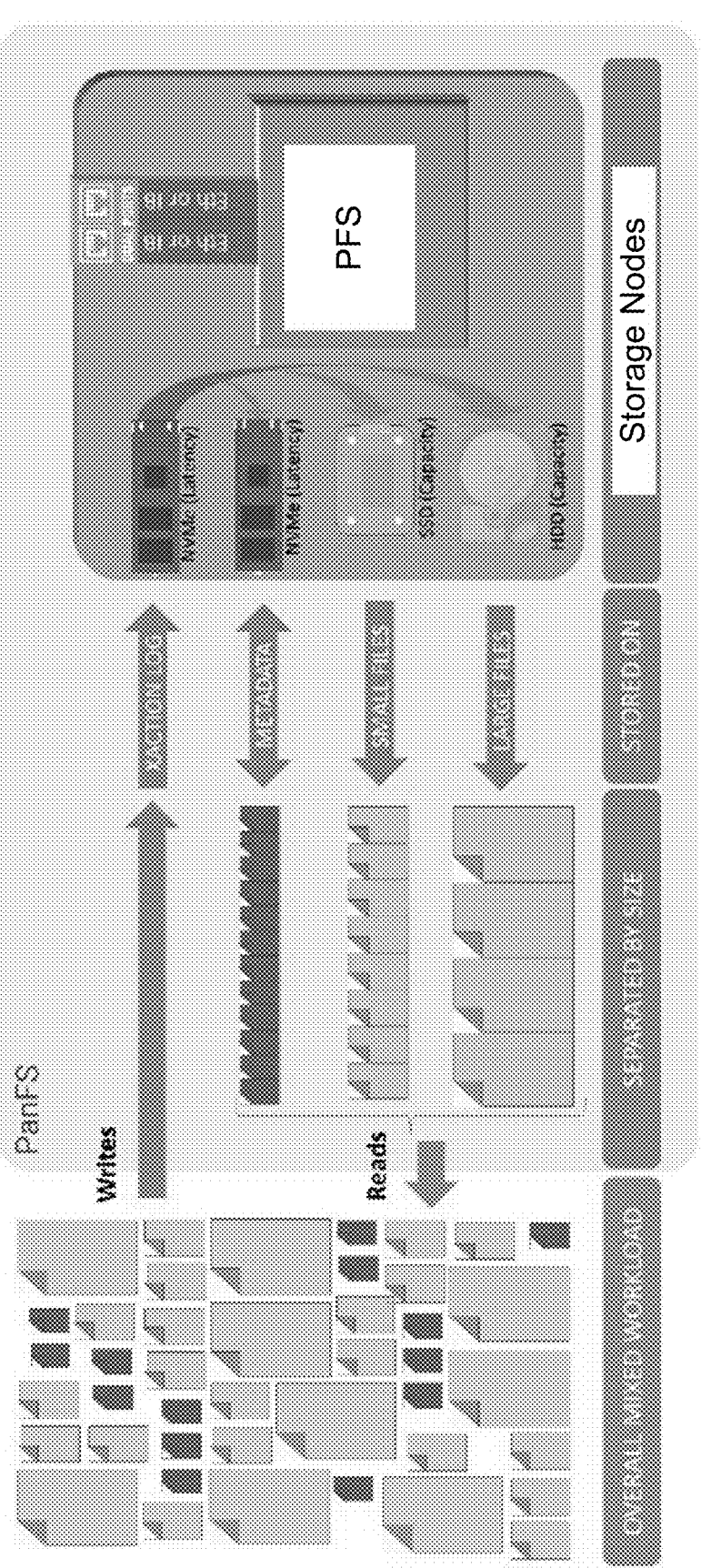
FIG. 3 illustrates the operation of storage nodes of the parallel file system, according to an embodiment.

FIG. 3 illustrates the operation of storage nodes of the PFS, according to an embodiment. The PFS architecture provides performance and reliability advantages as well as significant performance optimizations using the storage node software to enable efficient use of the available storage media inside each storage node. The PFS storage node handles multiple performance tiers of storage. According to an embodiment, the different performance tiers of a storage node include including storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The PFS takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The PFS tries to keep each SSD full above a threshold level, for example, above 80% full. If an SSD falls below that threshold level, the PFS selects the smallest component objects from the next slowest set of drives and moves them to the SSD until it is about 80% full. If the SSD is too full, PFS moves the largest component objects on the SSD to the next slower tier of drives. Every storage node performs this optimization independently and continuously. A storage node selects component objects to move by looking in its local metadata database.

Storage nodes in the PFS are object storage devices (OSDs). An object stored in an OSD is a Small Computer System Interface (SCSI) object. The PFS can be configured to create a blade set (BladeSet) for different classes of storage nodes. For example, storage nodes with a capacity of 280 TB each should not be combined into the same blade set as storage nodes with a capacity of 132 TB each. This helps evenly spread the workload across the pool of storage nodes and avoid hotspots. According to an embodiment, the PFS supports multiple blade sets in a realm and in the same namespace at the same time.

Figure 4:
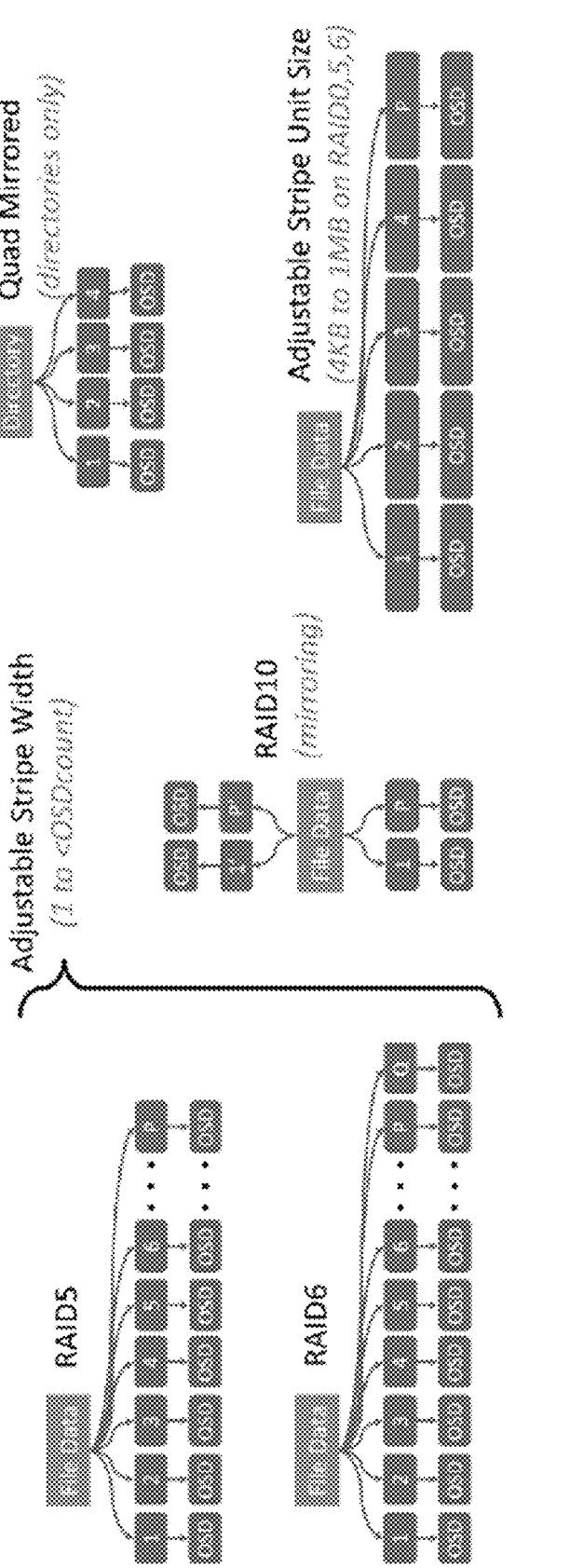
FIG. 4 shows the details of layout of a file stored in the parallel file system, according to an embodiment.

FIG. 4 shows the details of layout of a file stored in the PFS, according to an embodiment. The PFS stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The PFS stores large POSIX files using erasure coding across multiple component objects and stores small POSIX files using triple-replication across three component objects. This approach delivers higher performance and makes it more space efficient. Unless the first write to a file is a large one, the PFS starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a PFS storage node fails, the PFS reconstructs only those component objects that were on the failed storage node. This is distinct from a RAID array that would reconstruct the entire raw capacity of the storage node. The PFS reads the component objects for each affected file from all the other storage nodes and uses each file's erasure code to reconstruct the component objects that were on the failed node.

When a BladeSet in the PFS is first set up, the PFS sets aside a configurable amount of spare space on all the storage nodes in that BladeSet to hold the output from file reconstructions. When the PFS reconstructs a missing component object, it writes it to the spare space on a randomly chosen storage node in the same BladeSet. As a result, during a reconstruction the PFS uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the PFS protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the PFS maintains a complete directory tree, it can identify the full pathnames of precisely which files need to be restored from a backup or reacquired from their original source and can therefore also recognize which files were either unaffected or recovered using their erasure coding.

Storage System

Figure 5:
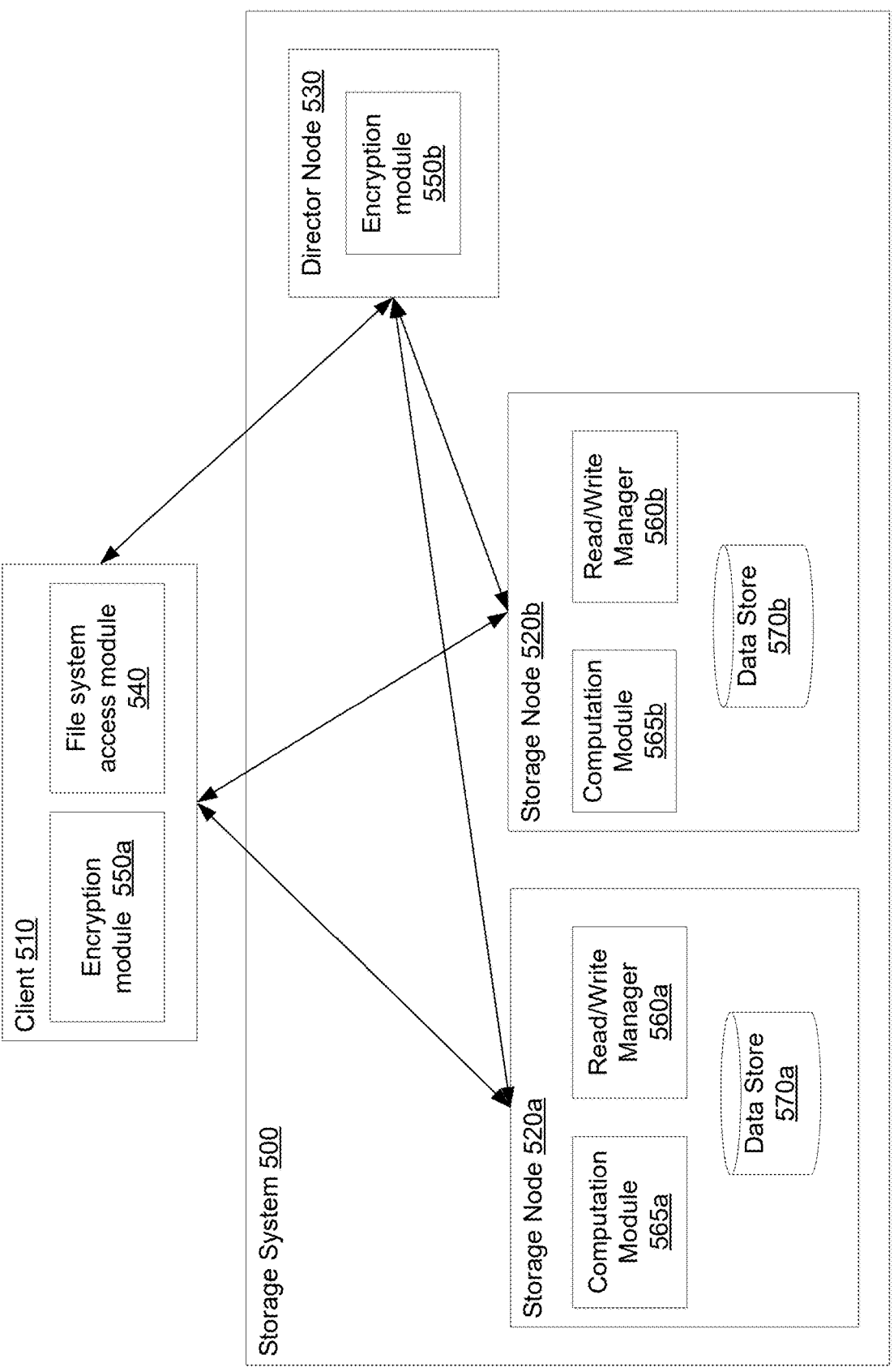
FIG. 5 shows the storage system for storing encrypted data, according to an embodiment.

FIG. 5 shows the storage system for storing encrypted data, according to an embodiment. The storage system comprises one or more storage nodes 520 and one or more director nodes 530. The storage system 500 may also be referred to herein as a parallel file system. The storage system 500 comprises a plurality of storage nodes 520*a*, 520*b*, and so on and one or more director nodes 530.

A storage node 520 stores data in a data store 570. For example, storage nodes 520*a*, 520*b* store data in data stores 570*a*, 570*b* respectively. The storage node 520 comprises a read/write manager 555 that manages read and write requests received from the client 510. For example, storage nodes 520*a*, 520*b* include read/write managers 555*a*, 555*b* respectively. A storage node 520 also includes a computation module 565. For example, storage nodes 520*a*, 520*b* include computation modules 565*a*, 565*b* respectively. The computation module 565 receives and processes requests to perform computations on the encrypted data stored in data store 570, for example, computations such as compression/decompression, deduplication, data mining, or collaborative processing of shared data.

The client 510 has access to the storage nodes 520 and the director node 530. The client 510 has a file system access module 540 and an encryption module 545*a*. An encryption module 54*b* may also be present in director node 530. The file system access module 540 is a client side library for interacting with the storage system. The encryption module 545 performs encryption of data.

The storage system incorporates homomorphic encryption (HE) capabilities into a parallel filesystem that provides file-level erasure coding. The parallel file system includes nodes that store data, nodes that manage the routing/placement of data, client nodes and optionally auxiliary compute nodes.

The encryption module 545 may perform homomorphic encryption (HE) of data. Examples of types of homomorphic encryption performed by encryption module 545 include in order of increasing capability and sophistication, PHE (partial homomorphic encryption), SHE (somewhat homomorphic encryption), and FHE (fully homomorphic encryption). The parallel file system uses at least one of the levels of HE. In general, a higher level of HE capability allows more sophisticated computation to be performed on the encrypted data and FHE is higher level of homomorphic encryption compared to SHE and SHE is higher level of homomorphic encryption compared PHE, i.e., in terms of levels of homomorphic encryption, the order is indicate as follows: level of FHE>level of SHE>level of PHE. For example, FHE allows more sophisticated computations to be performed on data compared to SHE and similarly, SHE allows more sophisticated computations to be performed on data compared to PHE. Furthermore, the number of computations allowed on encrypted data by FHE are more than the number of computations allowed on encrypted data by SHE and the number of computations allowed on encrypted data by SHE is greater than the number of computations allowed on encrypted data by PHE. The system determines which level of HE to use based on factors such as, cost of implementation (hardware/memory), performance (computation speed), and requirements of the computation being performed. According to an embodiment, the type of HE implemented is determined based on the type of computer processing power available. For example, if high processing power is available, the homomorphic encryption used may be SHE or FHE, whereas if low processing power is available, the implementation of homomorphic encryption used is PHE. According to an embodiment, the storage system supports multiple levels of HE and selects the level of homomorphic encryption used depending on various factors, for example, the amount of processing power currently available for handling a particular task, the level of security required for a current task, the level of sensitivity of the data being processed (for example, higher sophistication of homomorphic encryption such as FHE used for highly sensitive data and PHE used for less sensitive data), user's selection of the type of data processing. For example, the storage system may support both SHE and PHE, but use PHE when more processing resources are available but SHE when fewer processing resources are available. According to an embodiment, the storage system supports fewer types of data processing operations are supported for PHE compared to SHE and accordingly selects the level of homomorphic encryption based on the type of operations that need to be performed on the data. In that case the storage system selects PHE for higher performance if it allows the types of data processing they need or may select SHE for higher security. According to an embodiment, the system allows the user to select the type of homomorphic encryption used. According to an embodiment, the system makes a suggestion on the default type of homomorphic encryption to use or guide the user on the tradeoffs of the choices between different types of homomorphic encryption to use. According to yet another embodiment, the system automatically selects the type of homomorphic encryption to use based on the above factors.

According to some embodiments, the storage system includes different blade sets representing subsets of storage nodes or pools of storage nodes, each blade set supporting a particular type of homomorphic encryption. Accordingly, each blade set supports a maximum level of homomorphic encryption based on the type of hardware used by the blade set. The system assigns the maximum level of homomorphic encryption for a blade set based on the type of hardware used by the blade set. For example, a blade set S1 of storage nodes supports PHE, another blade set S2 of storage nodes supports SHE, and another blade set S3 of storage nodes supports FHE. There may be some blade sets that do not support any level of homomorphic encryption. A blade set that supports a particular level L1 of HE also supports one or more levels L2 that are below the level L1, i.e., L2<L1 since level L2 require fewer capabilities and sophistication than level L1.

According to an embodiment, a blade set has multiple volumes. Each volume may have a distinct homomorphic encryption level supported by the volume. Each volume forms storage space within the same set of storage nodes of a blade set. Accordingly, a blade set may have a volume V1 that supports a homomorphic encryption level H1 and another volume V2 that supports a homomorphic encryption level H2 distinct from H1. According to an embodiment, the parallel file system is used by a cloud platform and different volumes of a blade set may store data for different tenants of the cloud platform. Accordingly, the parallel file system supports different HE levels for different tenants of the cloud platform.

According to an embodiment, client 510 uses the file system access module 540 to get permission from the director node 530 to access the storage nodes 520. Once the client has permission to access the storage node 520 from the director node 530, the client can directly interact with the storage nodes 520 without involving the director node 530 for each interaction with the storage nodes 520.

According to an embodiment, client 510 uses the file system access module 540 to get a distribution map from the director node 530. The distribution map describes where to store chunks of data in the storage nodes 520. Once the client has the distribution map from the director node 520, the client can encrypt data using homomorphic encryption and directly store data in the storage nodes 520 without involving the director node 530. According to some embodiments, the director node 530 performs the encryption of data stored in the storage nodes 520.

According to an embodiment, the storage system implements a parallel file system that writes a stripe of data that is written to a plurality of storage nodes. The stripe of data may include parity data, such that in case of data loss on a storage node, parity data from other storage nodes can be used to reconstruct the lost data. The storage system may not be able to reconstruct the data if the failure occurs on more than a threshold number of storage nodes. In that situation, the storage system is able to recognize that the lost data cannot be reconstructed and reports to the client that there is data loss.

<p align="center">Processes</p>

Figure 6:
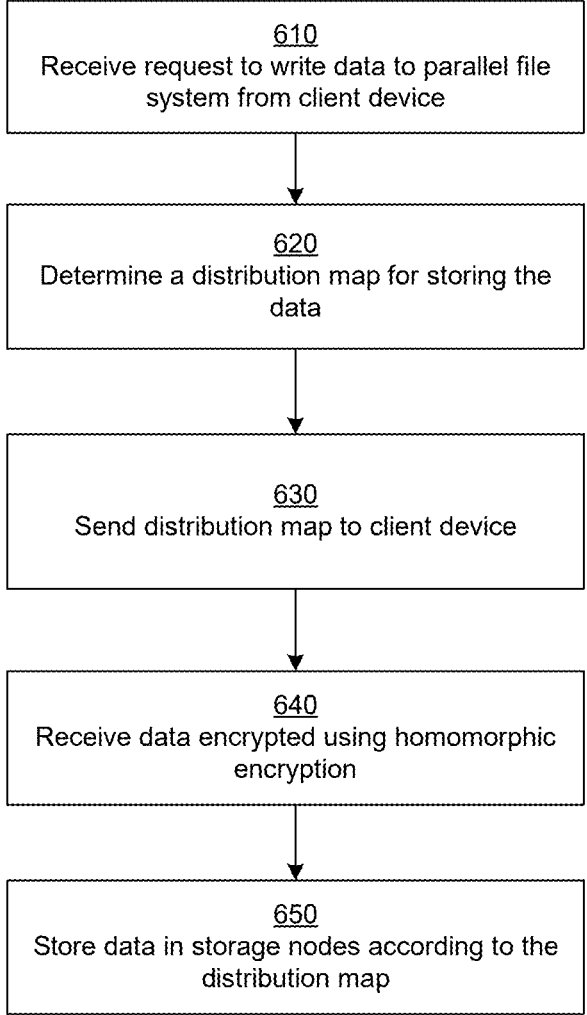
FIG. 6 shows a flowchart illustrating a process of storing encrypted data, according to an embodiment.
Figure 7:
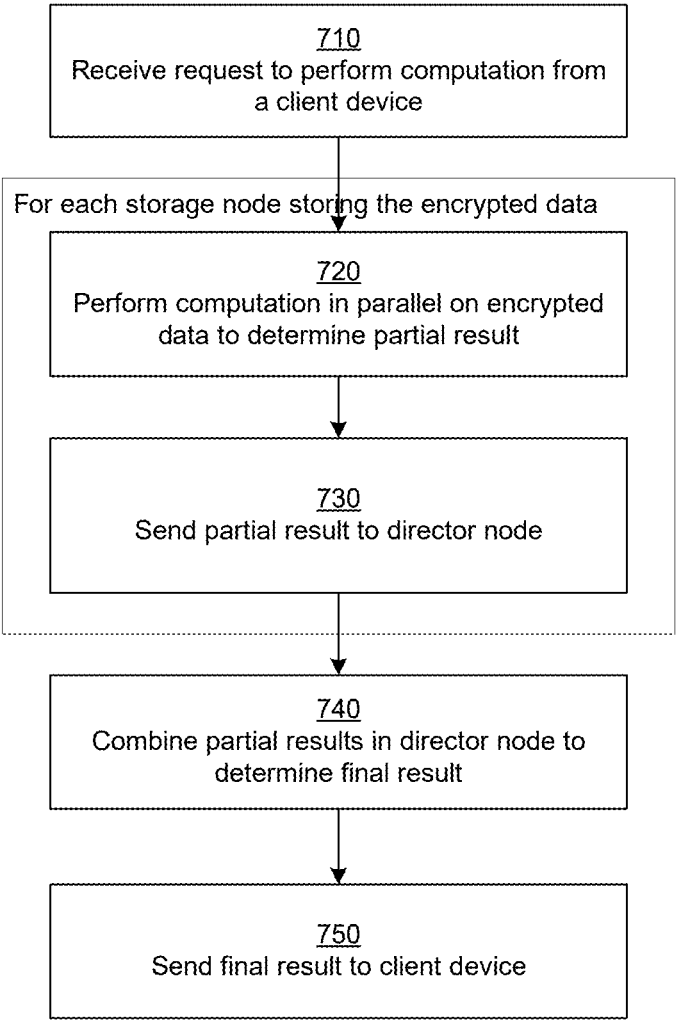
FIG. 7 shows a flowchart illustrating a process of performing a computation using encrypted data, according to an embodiment.

FIGS. 6-7 illustrates various processes for storing and processing data encrypted using homomorphic encryption according to various embodiments. The steps may be performed by a system, for example, a storage system such as a parallel file system. The steps may be performed in an order that is different from that indicated in the corresponding figures, for example, some steps may be performed in parallel or in a different order.

FIG. 6 shows a flowchart illustrating a process of storing encrypted data, according to an embodiment. The parallel file system receives, from a client device, write request to store data on the parallel file system. The parallel file system is configured to store data across multiple storage nodes. Furthermore, the parallel file system may perform the storing step in parallel across the storage nodes such that each storage node receives and stores a chunk of data independent of other storage nodes. According to an embodiment, the director node determines how to distribute the data based on choices made at volume creation time. The volumes may be created by a user, for example, by a system administrator. The storage system may receive from a system administrator, the overall data layout policies to use, for example whether to use distributed erasure coding or replication, and the stripe width to use. Using this configuration information, the director node chooses which storage nodes the clients should use.

In response to receiving the write request, the parallel file system determines a distribution map for storing the data. According to an embodiment, the distribution map for storing the data is determined by a director node that stores metadata describing data stored across the storage nodes. The distribution map identifies a plurality of storage nodes and includes a mapping from portions or chunks of data to storage nodes of the parallel file system. According to an embodiment, the distribution map is a pseudo-random distribution. For example, each distribution of a user-level file requires N chunks of data (e.g., if N is 10, there are 8 data chunks and 2 parity chunks for redundancy.) Assume, that are K different storage nodes in the system where K>N, and usually K>>N (much greater than N). The storage system distributes data by selecting a random group of N storage nodes out of the K available. According to an embodiment, the system uses a shuffle technique, (for example, a Fisher-Yates shuffle) on the K nodes, and then select the 1st N nodes of the shuffled list of nodes. The storage system stores the next set of chunks of data in the selected nodes. The next set of chunks repeats the process, re-shuffling the list and getting another random set. The storage system uses a pseudo-random number in the algorithm so that it can be repeated for testing or debugging purposes. The random nature of the choices ensures that over time, each storage node gets about the same amount of data as all the other nodes. Other embodiments may user other distribution techniques for distributing data across a plurality of storage nodes, for example, the CRUSH (Controlled Replication Under Scalable Hashing) Algorithm.

The parallel file system sends the distribution map to the client device. According to an embodiment, the director node that determines the distribution map sends the distribution map to the client device.

The parallel file system receives a plurality of chunks of encrypted data. The plurality of chunks of encrypted data are encrypted using homomorphic encryption. The parallel file system stores the plurality of chunks in the storage nodes. The parallel file system stores each chunk in a storage node as determined by the distribution map. According to an embodiment, the client devices perform the homomorphic encryption of the data before sending the data to the storage nodes. If there are multiple processors in the client device or if there are multiple client devices, each processor of client device can encrypt the data in parallel, thereby improving the performance of data encryption. If the homomorphic encryption is performed by director nodes, if there are multiple processors in a director node or if there are multiple director nodes, the director nodes or processors within a director node may perform the homomorphic encryption of the data for storing in parallel, thereby improving the performance of data encryption.

According to an embodiment, a client device or a director node perform homomorphic encryption of an entire stripe of data comprising an erasure code data set comprising a plurality of chunks of data, each chunk for data for storing in a storage node. The plurality of chunks of data include one or more chunks of parity data. The client device or the director node generates an encrypted stripe of data comprising a plurality of chunks of encrypted data that are stored in a plurality of storage nodes.

The stored data may be used for computations on the encrypted data without decrypting the data. If an entire stripe of data was encrypted using homomorphic encryption and stored in multiple storage nodes, the storage nodes may send the stripe of data to a director node that performs the computation on the entire stripe of data instead of individual nodes performing portions of the computation. The ability to perform the computation on the parallel file system allows the client devices to offload computation to the parallel file system, thereby improving the efficiency of computation and improving performance without compromising on the security of the data.

FIG. 7 shows a flowchart illustrating a process of performing a computation using encrypted data, according to an embodiment. The parallel file system receives 710 a request to perform certain computation on the stored data. Examples of computations performed include compression/decompression, deduplication, data mining, or collaborative processing of shared data. The request may be received from a client device.

The parallel file system performs the computations in parallel on the plurality of storage nodes. The computation is performed on the encrypted data without decrypting the encrypted data. The parallel file system sends the result of computation to the client device.

The parallel file system may perform the computation in parallel on different storage nodes, or on the director node, or a combination of the two. For example, if the homomorphic encryption is performed independently for each chunk stored in a storage node, the computation may be performed in parallel by each storage node. If the homomorphic encryption is performed for an entire stripe of data stored on a plurality of storage nodes, the computation is performed by a director node that receives the data from the storage nodes.

If the computation can be performed on a specific chunk of data independent on other chunks of data, the computation is performed by the storage nodes themselves. For example, compression or decompression of chunks of data may be performed in parallel by different storage nodes storing the chunks of data. Alternatively, the individual storage nodes perform computations in parallel to generate partial results and send the partial results to a node such as a director node to combine into a final result. In contrast, certain applications perform computations on an entire data set or a file of data and therefore send the entire stripe of data to a director node for performing the computation. For example, if a computation requires generating certain statistics based on the entire data stored in a stripe, the parallel file system sends the stripe of data to a director node for performing the computation. Similarly, deduplication of data is performed on an entire stripe of data and may be performed by sending the stripe of data to a director node for processing.

The flowchart in FIG. 7 shows an embodiment, in which a part of the computation is performed in parallel by storage nodes and a part of the computation is performed by the director node. Accordingly, each storage node storing the encrypted data performs 720 the computation in parallel on the encrypted data stored in the storage node to determine a partial result. Each storage node sends 730 the partial result to the director node. The director node receives the partial results from the storage nodes and combines 740 the partial results to determine the final result. The director node sends 750 the final result to the client device.

Computer Architecture

Figure 8:
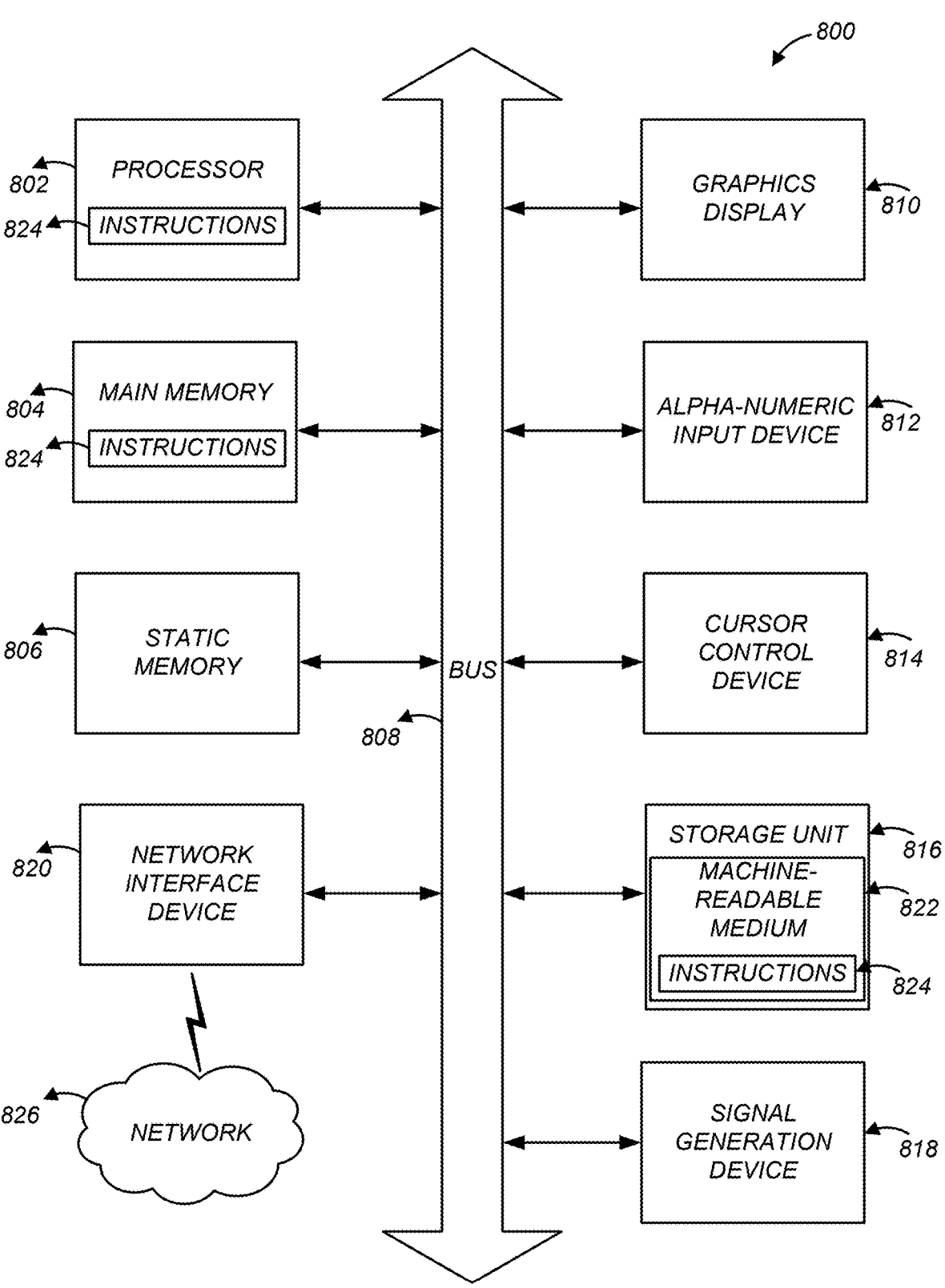
FIG. 8 is a block diagram illustrating components of an example machine able to read instructions from a machine-readable medium and execute them in a processor.

FIG. 8 is a block diagram illustrating components of an example machine able to read instructions from a machine-readable medium and execute them in a processor. Specifically, FIG. 8 shows a diagrammatic representation of a machine in the example form of a computer system 800 within which program code (e.g., software) for causing the machine to perform any one or more of the methodologies discussed herein may be executed. The program code may be comprised of instructions 824 executable by one or more processors 802. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors 802 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 804, and a static memory 806, which are configured to communicate with each other via a bus 808. The computer system 800 may further include visual display interface 810. The visual interface may include a software driver that enables (or provide) user interfaces to render on a screen either directly or indirectly. The visual interface 810 may interface with a touch enabled screen. The computer system 800 may also include input devices 812 (e.g., a keyboard a mouse), a cursor control device 814, a storage unit 816, a signal generation device 818 (e.g., a microphone and/or speaker), and a network interface device 820, which also are configured to communicate via the bus 808.

The storage unit 816 includes a machine-readable medium 822 (e.g., magnetic disk or solid-state memory) on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising:

receiving, from a client device, by a parallel file system, a write request to store data in the parallel file system, wherein the parallel file system stores data across multiple storage nodes;

responsive to receiving the write request, determining a distribution map for storing the data, the distribution map identifying a plurality of storage nodes and comprising a mapping from portions of data to storage nodes of the plurality of storage nodes;

sending the distribution map to the client device;

receiving a plurality of chunks of encrypted data, wherein the plurality of chunks of encrypted data are encrypted using homomorphic encryption, wherein encrypting the plurality of chunks comprises homomorphic encryption of a stripe of data, the stripe comprising one or more chunks of parity data;

storing, by the parallel file system, each of the plurality of chunks in a storage node according to the distribution map;

receiving, by the parallel file system, a request to perform a computation;

performing, by the parallel file system, the computation in parallel on the plurality of storage nodes, wherein the computation is performed on the encrypted data without decrypting the encrypted data; and sending a result of computation.

2. The computer-implemented method of claim 1, wherein the distribution map comprises an erasure coding layout to be used for storing the data.

3. The computer-implemented method of claim 2, wherein the distribution map is determined by a director node of the parallel file system and encrypting the plurality of chunks is performed by the director node.

4. The computer-implemented method of claim 1, wherein encrypting the plurality of chunks comprises homomorphic encryption of each chunk independently.

5. The computer-implemented method of claim 1, wherein encrypting the plurality of chunks is performed by the client device.

6. The computer-implemented method of claim 1, wherein the computation comprises at least one of:
  compression;
  deduplication;
  data mining; or
  collaborative processing of shared data.

7. The computer-implemented method of claim 1, wherein the parallel file system includes a director node, wherein performing the computation on the encrypted data comprises:
  for each storage node:
    performing computation on an encrypted chunk of data stored in the storage node to determine a partial result, and
    sending the partial result to the director node; and
  combining, by the director node, partial results received from the storage nodes to determine the result of the computation.

8. The computer-implemented method of claim 1, wherein the distribution map is determined based on server loading information received from the plurality of storage nodes.

9. A non-transitory computer readable storage medium storing instructions that when executed by one or more computer processors, cause the one or more computer processors to perform steps comprising:
  receiving, from a client device, by a parallel file system, a write request to store data in the parallel file system, wherein the parallel file system stores data across multiple storage nodes;
  responsive to receiving the write request, determining a distribution map for storing the data, the distribution map identifying a plurality of storage nodes and comprising a mapping from portions of data to storage nodes of the plurality of storage nodes;
  sending the distribution map to the client device;
  receiving a plurality of chunks of encrypted data, wherein the plurality of chunks of encrypted data are encrypted using homomorphic encryption, wherein encrypting the plurality of chunks comprises homomorphic encryption of a stripe of data, the stripe comprising one or more chunks of parity data;
  storing, by the parallel file system, each of the plurality of chunks in a storage node according to the distribution map;
  receiving, by the parallel file system, a request to perform a computation;
  performing, by the parallel file system, the computation in parallel on the plurality of storage nodes, wherein the computation is performed on the encrypted data without decrypting the encrypted data; and
  sending a result of computation.

10. The non-transitory computer readable storage medium of claim 9, wherein the distribution map comprises an erasure coding layout to be used for storing the data.

11. The non-transitory computer readable storage medium of claim 9, wherein encrypting the plurality of chunks comprises homomorphic encryption of each chunk independently.

12. The non-transitory computer readable storage medium of claim 9, wherein the computation comprises at least one of:
  compression;
  deduplication;

data mining; or
  collaborative processing of shared data.

13. The non-transitory computer readable storage medium of claim 9, wherein the parallel file system includes a director node, wherein instructions for performing the computation on the encrypted data cause the one or more computer processors to perform steps comprising:
  for each storage node:
    performing computation on an encrypted chunk of data stored in the storage node to determine a partial result, and
    sending the partial result to the director node; and
  combining, by the director node, partial results received from the storage nodes to determine the result of the computation.

14. The non-transitory computer readable storage medium of claim 9, wherein the distribution map is determined based on server loading information received from the plurality of storage nodes.

15. A computer system comprising:
  one or more computer processors; and
  a non-transitory computer readable storage medium storing instructions that when executed by the one or more computer processors, cause the one or more computer processors to perform steps comprising:
    receiving, from a client device, by a parallel file system, a write request to store data in the parallel file system, wherein the parallel file system stores data across multiple storage nodes;
    responsive to receiving the write request, determining a distribution map for storing the data, the distribution map identifying a plurality of storage nodes and comprising a mapping from portions of data to storage nodes of the plurality of storage nodes;
    sending the distribution map to the client device;
    receiving a plurality of chunks of encrypted data, wherein the plurality of chunks of encrypted data are encrypted using homomorphic encryption, wherein encrypting the plurality of chunks comprises homomorphic encryption of a stripe of data, the stripe comprising one or more chunks of parity data;
    storing, by the parallel file system, each of the plurality of chunks in a storage node according to the distribution map;
    receiving, by the parallel file system, a request to perform a computation;
    performing, by the parallel file system, the computation in parallel on the plurality of storage nodes, wherein the computation is performed on the encrypted data without decrypting the encrypted data; and
    sending a result of computation.

16. The computer system of claim 15, wherein the distribution map comprises an erasure coding layout to be used for storing the data.

17. The computer system of claim 15, wherein encrypting the plurality of chunks comprises homomorphic encryption of each chunk independently.

18. The computer system of claim 15, wherein the computation comprises at least one of:
  compression;
  deduplication;
  data mining; or
  collaborative processing of shared data.

19. The computer system of claim 15, wherein the parallel file system includes a director node, wherein instructions for performing the computation on the encrypted data cause the one or more computer processors to perform steps comprising:

for each storage node:

performing computation on an encrypted chunk of data stored in the storage node to determine a partial result, and sending the partial result to the director node; and combining, by the director node, partial results received from the storage nodes to determine the result of the computation.

20. The computer system of claim 15, wherein the distribution map is determined based on server loading information received from the plurality of storage nodes.

\*　\*　\*　\*　\*